US008485240B2

(12) United States Patent
Schinelli

(10) Patent No.: US 8,485,240 B2
(45) Date of Patent: Jul. 16, 2013

(54) MACHINE FOR LABELING BY MEANS OF LABELS PRINTED ON A RIBBON

(75) Inventor: Nicola Schinelli, Porto Mantovano (IT)

(73) Assignee: P.E. Labellers S.p.A., Porto Mantovano (IT)

( * ) Notice: Subject to any disclaimer, the term of this patent is extended or adjusted under 35 U.S.C. 154(b) by 25 days.

(21) Appl. No.: 13/139,645

(22) PCT Filed: Dec. 17, 2009

(86) PCT No.: PCT/EP2009/067458
§ 371 (c)(1),
(2), (4) Date: Jun. 14, 2011

(87) PCT Pub. No.: WO2010/072653
PCT Pub. Date: Jul. 1, 2010

(65) Prior Publication Data

US 2011/0240229 A1 Oct. 6, 2011

(30) Foreign Application Priority Data

Dec. 23, 2008 (IT) ............................ MN2008A0029

(51) Int. Cl.

| | |
|---|---|
| ***B29B 65/00*** | (2006.01) |
| ***B32B 37/00*** | (2006.01) |
| ***B32B 38/04*** | (2006.01) |
| ***B32B 38/10*** | (2006.01) |

(52) U.S. Cl.
USPC .......................................... 156/521; 156/556

(58) Field of Classification Search
USPC .......................... 156/518, 521, 556, 264, 270
See application file for complete search history.

(56) References Cited

U.S. PATENT DOCUMENTS

| | | | | |
|---|---|---|---|---|
| 4,242,167 | A | 12/1980 | Hoffmann | |
| 4,685,392 | A * | 8/1987 | Watanabe | 101/226 |
| 4,802,632 | A * | 2/1989 | Fukuda et al. | 242/526.3 |
| 5,679,209 | A | 10/1997 | Hinton et al. | |
| 5,688,363 | A | 11/1997 | Hinton et al. | |
| 6,485,803 | B1 | 11/2002 | Bright | |
| 8,066,046 | B2 * | 11/2011 | Ballarotti | 156/446 |
| 2002/0185232 | A1 | 12/2002 | Draghetti et al. | |
| 2004/0007327 | A1 * | 1/2004 | Kobayashi | 156/353 |
| 2004/0009650 | A1 * | 1/2004 | Jeong et al. | 438/462 |
| 2005/0188655 | A1 | 9/2005 | Thatenhorst | |
| 2009/0173450 | A1 | 7/2009 | Thatenhorst | |
| 2010/0018650 | A1 | 1/2010 | Ballarotti | |

FOREIGN PATENT DOCUMENTS

| | | |
|---|---|---|
| DE | 19741476 | 3/1999 |
| WO | WO 2008/077457 | 7/2008 |

OTHER PUBLICATIONS

Italian Search Report in the corresponding priority application MN2008A000029.

* cited by examiner

*Primary Examiner* — Linda L Gray
(74) *Attorney, Agent, or Firm* — Greer, Burns & Crain Ltd.

(57) ABSTRACT

A machine for labeling by means of labels printed on a ribbon comprising a rotating carousel for supporting containers to be labeled, a device for tensioning, a feeder, a drum for cutting and a drum for pasting with a corresponding roller for spreading adhesive, all being mounted on a movable slider between a first position and a second position, the slider being provided with elements for movement along a guide whose direction is tangent to the carousel between the first and second positions.

1 Claim, 4 Drawing Sheets

MACHINE FOR LABELING BY MEANS OF LABELS PRINTED ON A RIBBON

TECHNICAL FIELD

The invention relates to a machine for labeling by means of labels printed on a ribbon.

BACKGROUND ART

It is known that the practice of printing on a ribbon labels designed to be applied to successive containers, the ribbon being wound in the form of a reel, is currently very widespread and that two types of ribbons are commercially available.

A first type of ribbon is provided with a film of adhesive at the face designed to adhere to the containers to be labeled, and in this case one speaks of "pre-pasted labels"; the film of glue can be present on the entire surface of the labels or only at their edges.

The second type of ribbon is instead without glue, which is thus spread onto it only at the time of use.

The background art currently provides for the presence of labeling machines designed to process the first type of ribbon and of labeling machines for the second type of ribbon, with a need for considerable commitment of capital for companies dedicated to packaging.

DISCLOSURE OF THE INVENTION

The aim of the present invention is to provide a labeling machine that can work with both types of ribbon.

This aim is achieved by a machine for labeling by means of labels printed on a ribbon, as defined in the appended claim.

BRIEF DESCRIPTION OF THE DRAWINGS

Further characteristics and advantages of the present invention will become better apparent from the description of a preferred but not exclusive embodiment thereof, illustrated by way of non-limiting example in the accompanying drawings, wherein.

WAYS OF CARRYING OUT THE INVENTION

Figure 1:
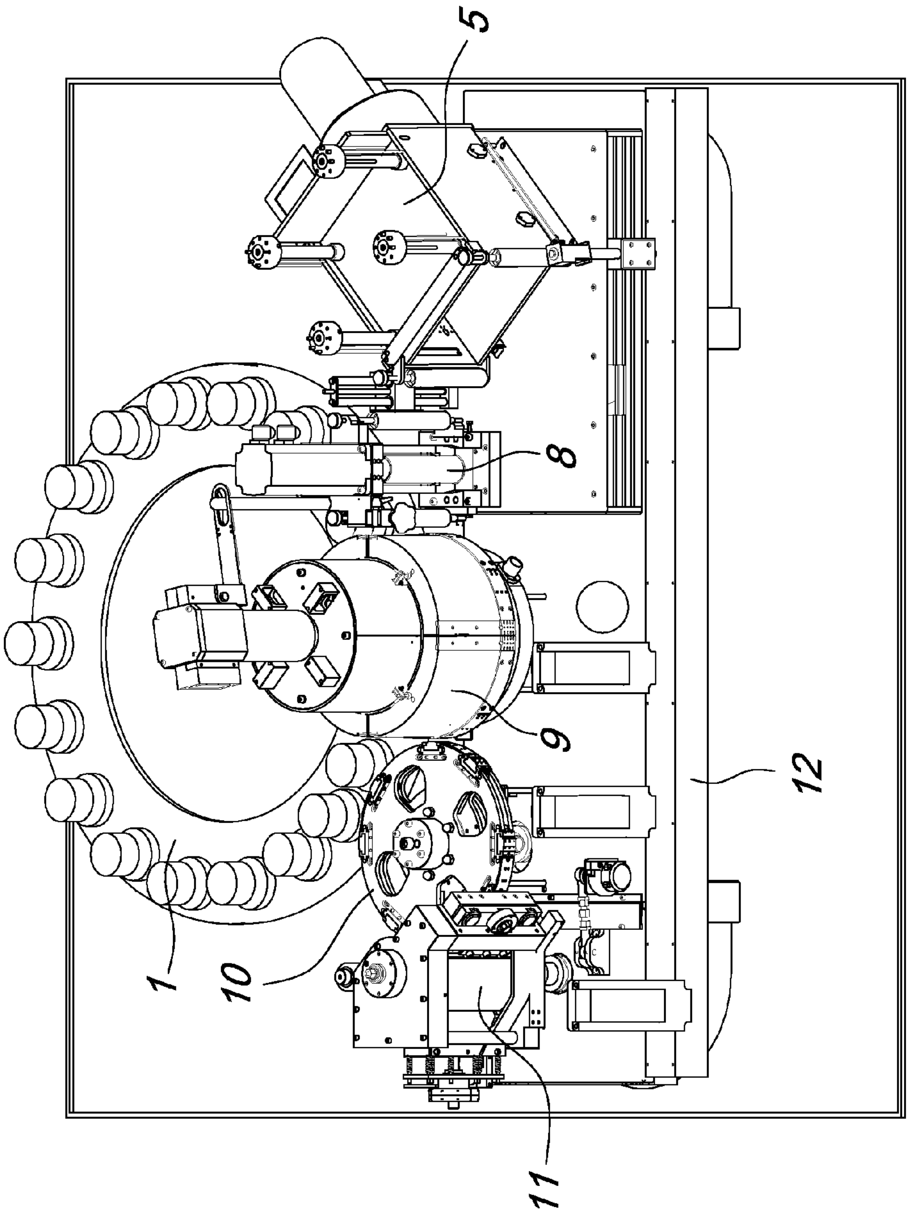
FIG. 1 is a general view of the elements of the machine according to the present invention in a first operating position.

With reference to the figures, the reference numeral 1 designates a carousel, which rotates counterclockwise, for supporting containers to be labeled, which are fed by means of an input star conveyor 2 and evacuated by means of an output star conveyor 3. The carousel is provided with pans for supporting the individual containers, which are suitably rotated, and the reference numeral 4 designates a pan that supports the container that is ready to receive a label at the instant shown in the figures.

The machine further comprises a device 5 for tensioning a ribbon of labels 6 that unwinds from a roller 7, a feeder 8, which receives the ribbon in output from the tensioning device 5 in order to send it to a cutting drum 9, and finally comprises a drum 10 for pasting labels in output from the cutting drum with a corresponding roller 11 for spreading adhesive; the peculiarity of the machine according to the invention consists in that said devices, all of a per se known type, are mounted on a slider 12 provided with means for movement along a guide 13 in a direction which is tangent to the carousel 1 between the two stroke limit positions shown respectively in FIGS. 1, 2 and 3, 4.

Figure 2:
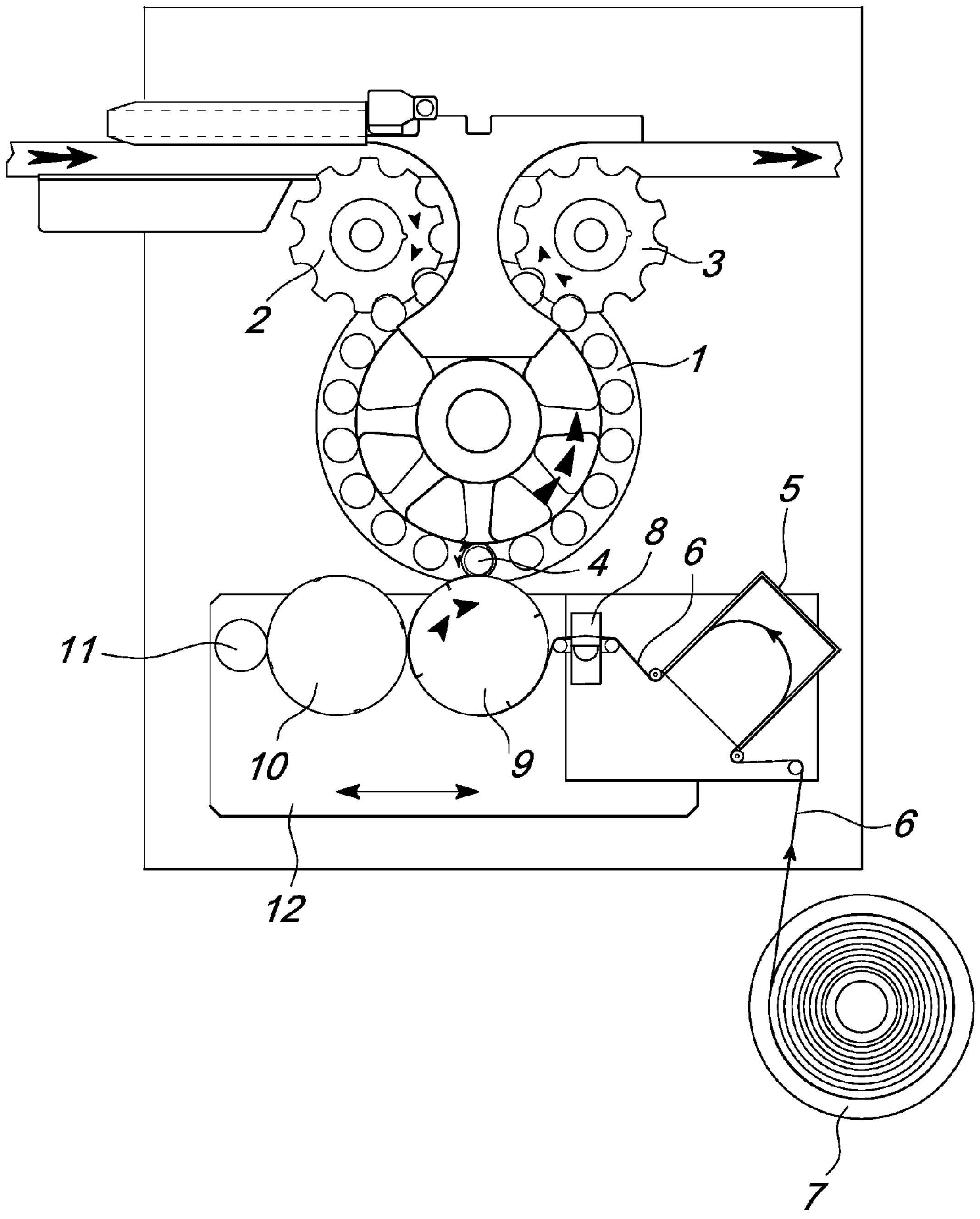
FIG. 2 is a schematic plan view of the machine in the first operating position.

The first position, shown in FIGS. 1 and 2, is the one in which the cutting drum 9 faces the container ready to receive a label, which is arranged on the pan in position 4, and in this position the drum 9 is turned clockwise, in the opposite direction with respect to the direction of rotation of the carousel 1, while the pasting drum 10 and the corresponding adhesive spreading roller 11 are kept stationary.

Clearly, this first position is adapted to be assumed when the machine is intended to work on a ribbon of pre-pasted labels, because in this case the drum 9 is capable of transferring directly each cut label onto the container that it faces, but the same machine can also be used when the label ribbon is of the type designed to receive the adhesive at the time of use.

Figure 3:
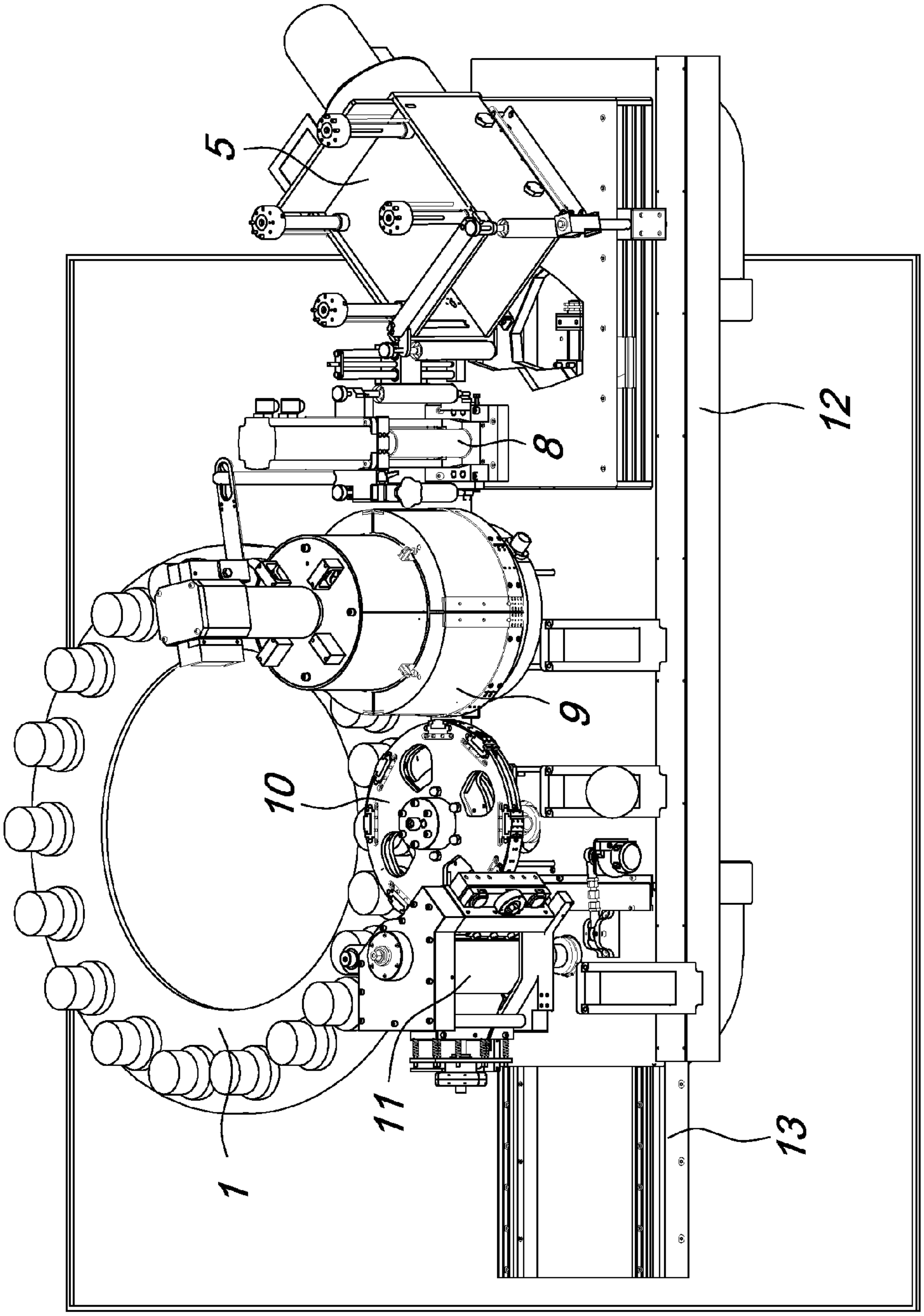
FIGS. 3 and 4 illustrate the machine according to the invention in a second operating position.
Figure 4:
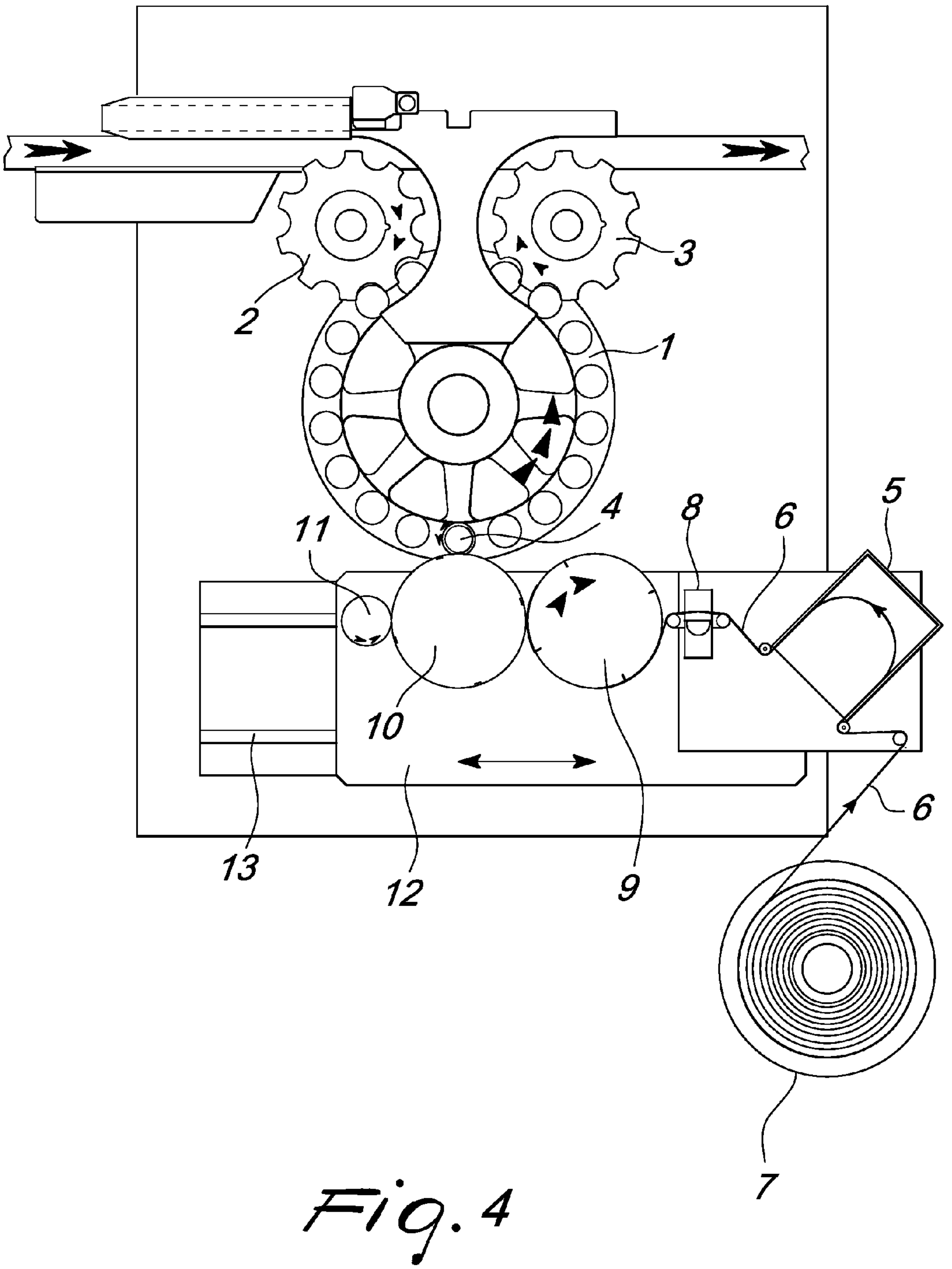

For this purpose it is sufficient to arrange the machine in the configuration with the slider 12 in the second position, shown in FIGS. 3 and 4. In this second position, the pasting drum 10 in fact faces the container on the pan in position 4, which is ready to receive a label, with a clockwise rotary motion which is opposite to the motion of the carousel 1, while the cutting drum 9 rotates counterclockwise, and in this manner the labels cut by the drum 9 are spread with adhesive on the drum 10 and pass to the container ready to receive them.

Thus, the labeling machine according to the invention is capable of working in the presence of labels printed on a ribbon both of the pre-pasted type and of the type designed to receive glue only at the time of use, thus offering a great possibility of saving to packaging companies.

The described invention is susceptible of numerous modifications and variations, all of which are within the scope of the appended claim; all the details may further be replaced with other technically equivalent elements.

The disclosures in Italian Patent Application No. MN2008A000029 from which this application claims priority are incorporated herein by reference.

The invention claimed is:

1. A machine for labeling by means of labels printed on a ribbon, comprising a rotating carousel for supporting containers to be labeled, a tensioning device for tensioning a label ribbon that unwinds from a reel, a feeder which receives the label ribbon at the output of the tensioning device, a cutting drum for cutting the label ribbon at the output of the feeder, a pasting drum for pasting the labels with a corresponding roller for spreading adhesive on labels at the output of the cutting drum, a slider upon which said tensioning device, said feeder, and said cutting drum, and said pasting drum are mounted, and a guide along which said slider is movable in a direction tangent to the carousel between a first position, in which the cutting drum faces the container ready to receive a label, and a second position, in which the pasting drum faces the container ready to receive a label, said cutting drum being rotatable, when the slider is in the first position, in the opposite direction with respect to the direction of rotation of the container supporting carousel while the pasting drum with the corresponding adhesive spreading roller is kept stationary, and said cutting drum being rotatable, when the slider is in the second position, in the same direction as the direction of rotation of the carousel and pasting drum being rotatable in the opposite direction with respect to the direction of rotation of the carousel.

* * * * *